(12) United States Patent
Jung

(10) Patent No.: US 10,793,140 B2
(45) Date of Patent: Oct. 6, 2020

(54) FUEL PUMP SYSTEM OF HYBRID VEHICLE

(71) Applicants: Hyundai Motor Company, Seoul (KR); Kia Motors Corporation, Seoul (KR)

(72) Inventor: Jang Hyun Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 148 days.

(21) Appl. No.: 16/007,651

(22) Filed: Jun. 13, 2018

(65) Prior Publication Data

US 2018/0290648 A1    Oct. 11, 2018

Related U.S. Application Data

(62) Division of application No. 15/170,248, filed on Jun. 1, 2016, now Pat. No. 10,023,185.

(30) Foreign Application Priority Data

Dec. 9, 2015    (KR) .................. 10-2015-0175292

(51) Int. Cl.
*B60W 20/40*    (2016.01)
*B60W 50/14*    (2020.01)
(Continued)

(52) U.S. Cl.
CPC .............. *B60W 20/40* (2013.01); *B60K 6/24* (2013.01); *B60K 15/00* (2013.01); *B60K 15/03* (2013.01);
(Continued)

(58) Field of Classification Search
CPC ......... B60W 20/40; B60W 50/14; B60K 6/24; B60K 15/00; B60K 15/03; F02D 29/02;
(Continued)

(56) References Cited

U.S. PATENT DOCUMENTS 5,186,138 A * 2/1993 Hashimoto ............. F02D 17/04
                                                123/198 DB
5,339,785 A * 8/1994 Wilksch ................ F02D 33/006
                                                123/457

(Continued)

FOREIGN PATENT DOCUMENTS

CN      101559770 A     10/2009
JP      10-085254 A     4/1998
(Continued)

OTHER PUBLICATIONS

NPL of english translation JP 2013147057 A1 (Year: 2013).*

*Primary Examiner* — Yazan A Soofi
(74) *Attorney, Agent, or Firm* — Mintz Levin Cohn Ferris Glovsky and Popeo, P.C.; Peter F. Corless

(57) ABSTRACT

A fuel pump system of a hybrid vehicle is provided. The fuel pump system prevents a fuel pump from continuing to operate when fuel is exhausted, whereby the fuel pump may be damaged. The pressure of fuel is measured in response to exhaustion of fuel, and when the pressure of fuel is low, fuel is circulated within the fuel pump instead of being supplied to the engine side, thereby preventing the fuel pump from being stuck due to frictional heat.

2 Claims, 6 Drawing Sheets

(51) Int. Cl.
*B60K 6/24* (2007.10)
*B60K 15/00* (2006.01)
*B60K 15/03* (2006.01)
*F02D 33/00* (2006.01)
*F02D 41/26* (2006.01)
*F02D 41/30* (2006.01)
*F02M 37/00* (2006.01)
*F02M 37/10* (2006.01)
*F02D 29/02* (2006.01)
*B60W 20/00* (2016.01)

(52) U.S. Cl.
CPC ............ *B60W 50/14* (2013.01); *F02D 29/02* (2013.01); *F02D 33/006* (2013.01); *F02D 41/26* (2013.01); *F02D 41/3005* (2013.01); *F02M 37/0023* (2013.01); *F02M 37/0029* (2013.01); *F02M 37/10* (2013.01); *B60K 2015/03111* (2013.01); *B60K 2015/03243* (2013.01); *B60W 20/00* (2013.01); *B60W 2050/146* (2013.01); *B60W 2530/209* (2020.02); *B60W 2710/06* (2013.01); *B60W 2710/0616* (2013.01); *B60Y 2200/92* (2013.01); *F02M 2200/50* (2013.01); *Y10S 903/905* (2013.01)

(58) Field of Classification Search
CPC .... F02D 33/006; F02D 41/26; F02D 41/3005; F02M 37/0023; F02M 37/0029; F02M 37/10

USPC .......................................................... 701/22
See application file for complete search history.

(56) References Cited

U.S. PATENT DOCUMENTS

| | | | |
|---|---|---|---|
| 2014/0026865 A1* | 1/2014 | Dudar | .................. F02M 37/106 123/518 |
| 2014/0216418 A1 | 8/2014 | Asayama | |
| 2014/0230791 A1 | 8/2014 | Kojima et al. | |
| 2016/0363092 A1 | 12/2016 | Kaneko | |
| 2017/0030358 A1 | 2/2017 | Fischer et al. | |
| 2017/0037806 A1* | 2/2017 | Dudar | .................. F02D 41/222 |
| 2017/0088011 A1 | 3/2017 | Li | |
| 2017/0130659 A1* | 5/2017 | Dudar | ............. B60K 15/03504 |
| 2018/0245525 A1 | 8/2018 | Koike et al. | |

FOREIGN PATENT DOCUMENTS

| | | | | |
|---|---|---|---|---|
| JP | 2002-250255 | A | | 9/2002 |
| JP | 2013-023043 | A | | 2/2013 |
| JP | 2013-147057 | A | | 8/2013 |
| JP | 2013147057 | A | * | 8/2013 |
| JP | 2014-202101 | A | | 10/2014 |
| KR | 1999-0019060 | A | | 3/1999 |
| KR | 10-2006-0049593 | A | | 5/2006 |
| KR | 2008-0052429 | A | | 6/2008 |
| KR | 2009-0064074 | A | | 6/2009 |
| KR | 2011-0035017 | A | | 4/2011 |
| WO | 2013/035131 | A1 | | 3/2015 |

* cited by examiner

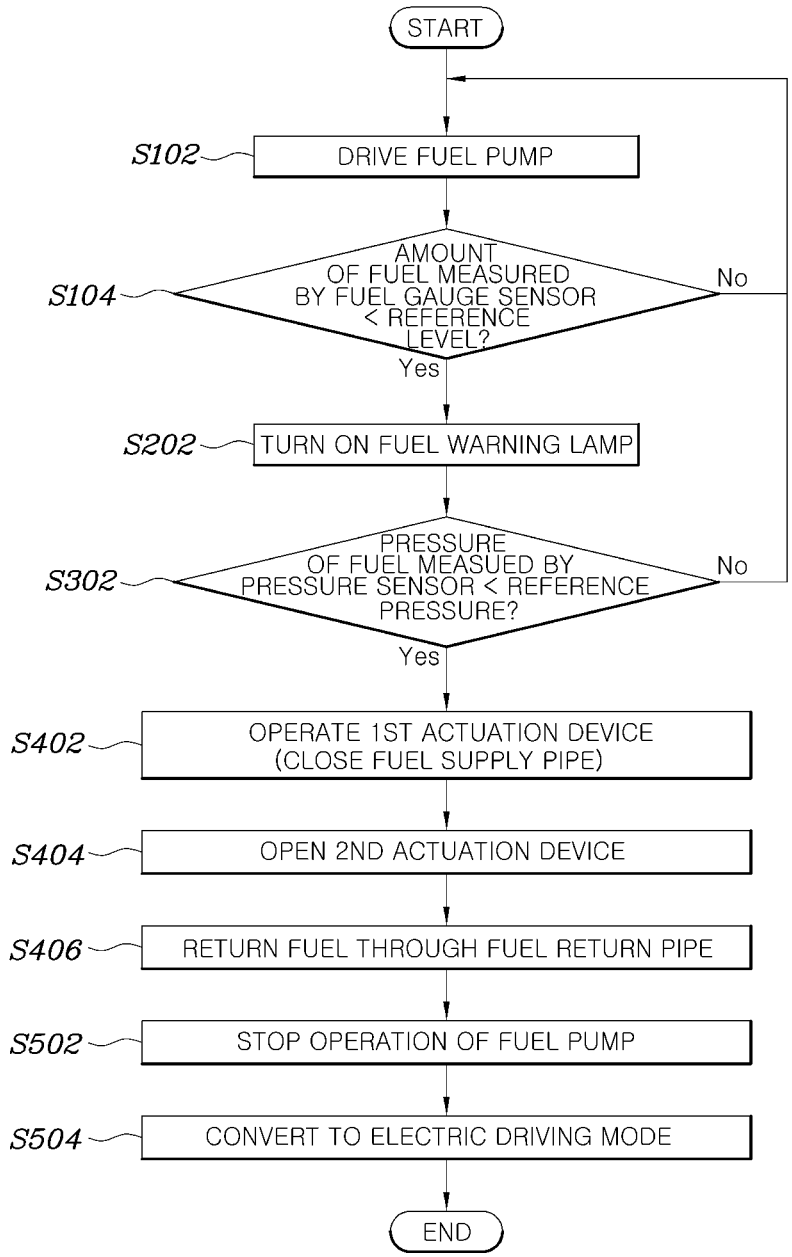

FUEL PUMP SYSTEM OF HYBRID VEHICLE

CROSS REFERENCE TO RELATED APPLICATION

This application is a Divisional Application of U.S. patent application Ser. No. 15/170,248 filed on Jun. 1, 2016 which claims priority to Korean Patent Application No. 10-2015-0175292 filed Dec. 9, 2015, the entire contents of which is incorporated herein for all purposes by this reference.

BACKGROUND

Field of the Invention

The present invention generally relates to a fuel pump system of a hybrid vehicle, and more particularly, to a fuel pump system that prevents a fuel pump from continuing to operate when fuel is exhausted, causing damage to the fuel pump.

Description of the Related Art

Generally, a vehicle is equipped with a fuel tank for storing fuel. A reservoir cup that stores a fixed amount of fuel to efficiently supply fuel to an engine is disposed in the interior of the fuel tank. The reservoir cup stores fuel therein to continuously refill fuel in the fuel tank. Fuel to be supplied to the engine side is contained within the reservoir cup, and in response to the operation of the fuel pump, fuel in the fuel tank and the reservoir cup is properly supplied.

However, when the fuel pump is continuously operated and fuel in the fuel tank is exhausted, the fuel pump operates in the dry-run condition and thus, inner components of the fuel pump are stuck by frictional heat. In other words, even when fuel in the fuel tank and the reservoir cup is exhausted, when the engine of the vehicle is running, the fuel pump continues to operate. Accordingly, fuel in the fuel pump does not circulate, and the inner components are subjected to friction against each other. Thus, the components may be stuck, thereby causing the fuel pump to break down. Therefore, an approach able to protect the fuel pump when fuel is exhausted is required.

The foregoing is intended merely to aid in the understanding of the background of the present invention, and is not intended to mean that the present invention falls within the purview of the related art that is already known to those skilled in the art.

SUMMARY

Accordingly, the present invention provides a fuel pump system of a hybrid vehicle, the fuel pump system being able to prevent a fuel pump from continuing to operate when fuel is exhausted, whereby the fuel pump may be damaged.

According to one aspect of the present invention, a fuel pump system of a hybrid vehicle may include: a reservoir cup including a fuel pump configured to suction fuel from a fuel tank; a fuel supply pipe connected to the fuel pump and extending to allow fuel to be supplied therethrough to an engine in response to an operation of the fuel pump; a fuel return pipe branched from the fuel supply pipe and extending into the reservoir cup to allow fuel to return to the reservoir cup therethrough; a first blocking device disposed on the fuel supply pipe, the first blocking device configured to selectively close the fuel supply pipe to block the supply of fuel; a pressure sensor configured to detect a pressure of fuel supplied to the fuel supply pipe; and a controller configured to operate the first blocking device, wherein the controller is configured to receive information regarding the pressure of fuel measured by the pressure sensor, and when the measured pressure of fuel is less than a previously-stored reference pressure, the controller is configured to operate the first blocking device to close the fuel supply pipe, whereby fuel circulates within the reservoir cup.

The fuel pump system may further include a second blocking device disposed on the fuel return pipe. The second blocking device may be configured to permit or block the supply of fuel based on the pressure of fuel supplied through the fuel return pipe. The second blocking device may be a regulator configured to permit the supply of fuel when the pressure of fuel supplied through the fuel return pipe is equal to or greater than a preset pressure and block the supply of fuel when the pressure of fuel supplied through the fuel return pipe is less than the preset pressure. A first end of the fuel supply pipe may be connected to a supply port of a plate, wherein fuel is supplied to the engine through the supply port of the plate. A second end of the fuel supply pipe may be connected to the fuel pump. A first end of the fuel return pipe may be connected to the fuel supply pipe, at a top side of the reservoir cup. A second end of the fuel return pipe may extend to a bottom side of the reservoir cup.

The first blocking device may be a solenoid including: a housing having an engine outlet port on a first side and a pump outlet port on a second side, and having defined therein an inner space; a plunger movably disposed within the inner space of the housing, wherein the plunger may be configured to close the engine outlet port or the fuel pump outlet port based on a direction in which the plunger is driven; an electromagnet connected to the plunger, wherein the electromagnet may be configured to drive the plunger to move in response to electric power applied thereto; and a return spring engaged with one surface of the plunger.

When the pressure of fuel measured by the pressure sensor is equal to or greater than the reference pressure, the controller may be configured to operate the first blocking device to open the fuel supply pipe. The controller may be configured to receive information regarding fuel from a fuel gauge sensor disposed within the fuel tank. When an amount of fuel measured by the fuel gauge sensor is less than a previously-stored reference level, the controller may be configured to receive information regarding the pressure of fuel and operate the first blocking device based on the received information regarding the pressure of fuel. The controller may be configured to generate a fuel warning signal when the amount of fuel measured by the fuel gauge sensor is less than the previously-stored reference level.

According to another aspect of the present invention, a method of controlling the above-described fuel pump system of a hybrid vehicle may include: comparing an amount of fuel measured by a fuel gauge sensor with a reference level previously stored in a controller; turning on a warning lamp when the measured amount of fuel is less than the reference level; comparing a pressure of fuel measured by a pressure sensor with a reference pressure previously stored in the controller; closing a fuel supply pipe by operating a first actuation device when the measured pressure of fuel is less than the reference pressure. The method may further include, after closing the fuel supply pipe, when the pressure of fuel is less than the reference level, stopping an operation of a fuel pump, and converting driving mode of a vehicle to electric driving mode.

According to a further aspect of the present invention, a method of controlling a fuel pump system of a hybrid vehicle may include: measuring, using a pressure sensor, a pressure of fuel supplied from a reservoir cup of a fuel pump to an engine side in response to an operation of the fuel pump and comparing the measured pressure of fuel with a reference pressure; and when the measured pressure of fuel is less than a reference pressure, blocking supply of fuel to the engine side, and stopping the operation of the fuel pump.

The method may further include causing the fuel pump to operate ordinarily when the measured pressure of fuel is equal to or greater than the reference pressure, to run a vehicle due to an operation of the engine. The method may further include, after stopping the operation of the fuel pump, when the measured pressure of fuel is less than the reference pressure, converting driving mode of a vehicle to electric driving mode. Additionally, the method may include: prior to measuring the pressure of fuel, comparing an amount of fuel measured by a fuel gauge sensor with a reference level previously stored in a controller; and when the measured amount of fuel is less than a reference level, turning on a warning lamp.

According to the system of the fuel pump having the above-described structure, it may be possible to prevent the fuel pump from continuing to operate when fuel is exhausted, whereby the fuel pump may be damaged. In particular, the pressure of fuel is measured in response to exhaustion of fuel, and when the pressure of fuel is low, fuel may circulate within the fuel pump instead of being supplied to the engine side, thereby preventing the fuel pump from being stuck due to frictional heat.

BRIEF DESCRIPTION OF THE DRAWINGS

The above and other objects, features and other advantages of the present invention will be more clearly understood from the following detailed description when taken in conjunction with the accompanying drawings, in which:

FIGS. 5 and 6 are flowcharts illustrating the operation of the fuel pump system of a hybrid vehicle according to an exemplary embodiment the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a fuel pump system of a hybrid vehicle according to an exemplary embodiment of the present invention will be described with reference to the accompanying drawings.

Figure 1:
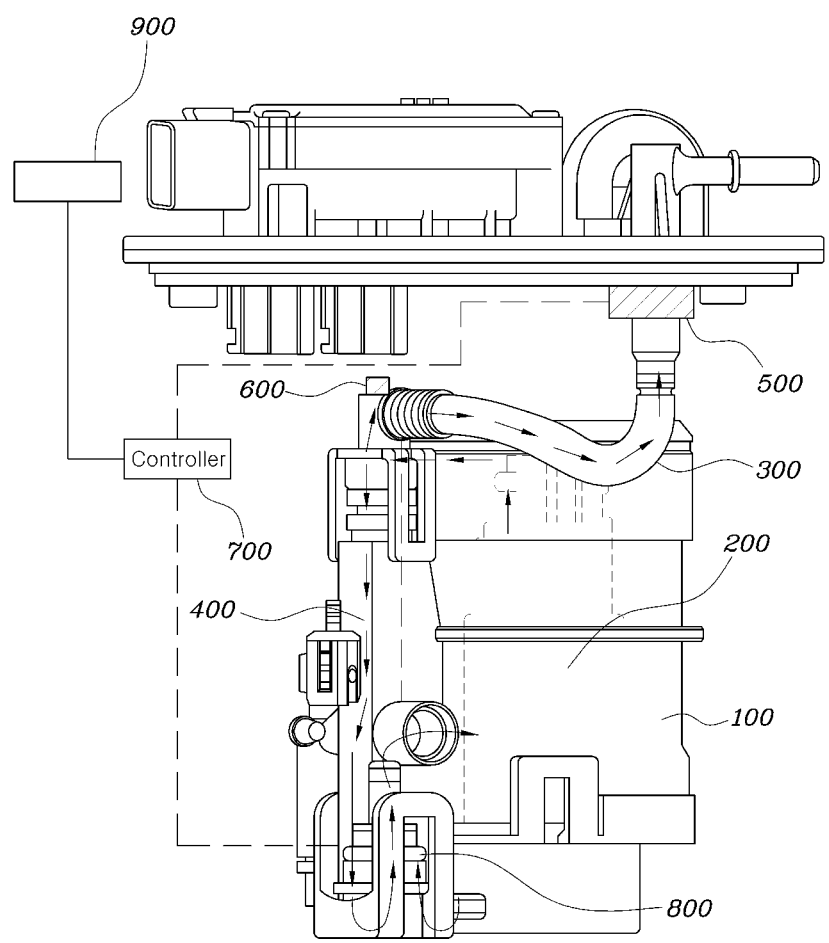
FIG. 1 is a configuration view illustrating a fuel pump system of a hybrid vehicle according to an exemplary embodiment of the present invention.
Figure 2:
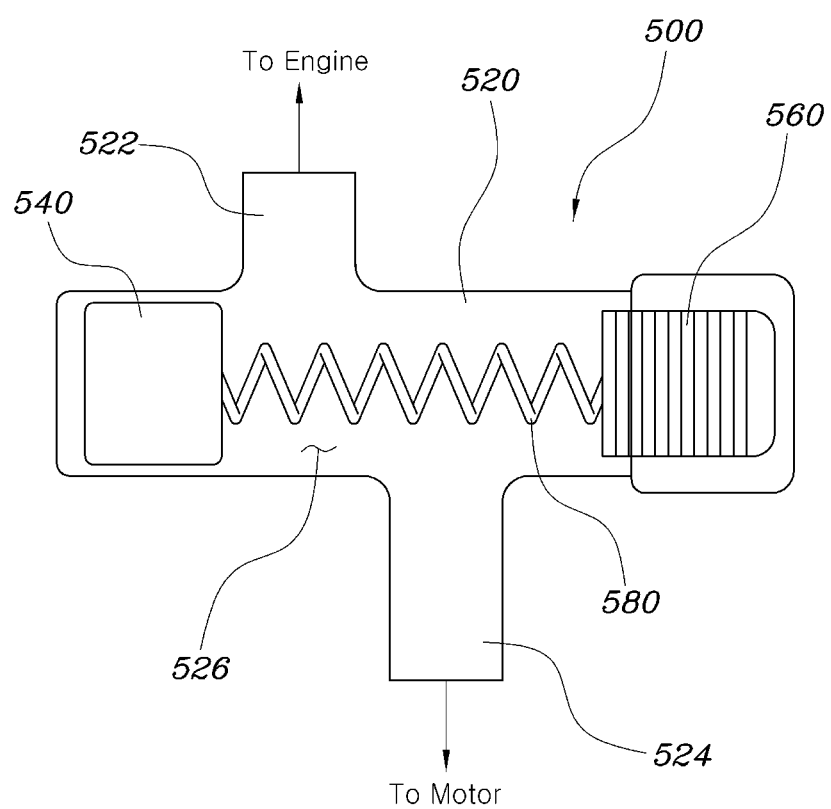
FIGS. 2 and 3 are schematic views illustrating the first blocking device of the fuel pump system of a hybrid vehicle illustrated in FIG. 1 according to an exemplary embodiment of the present invention.
Figure 3:
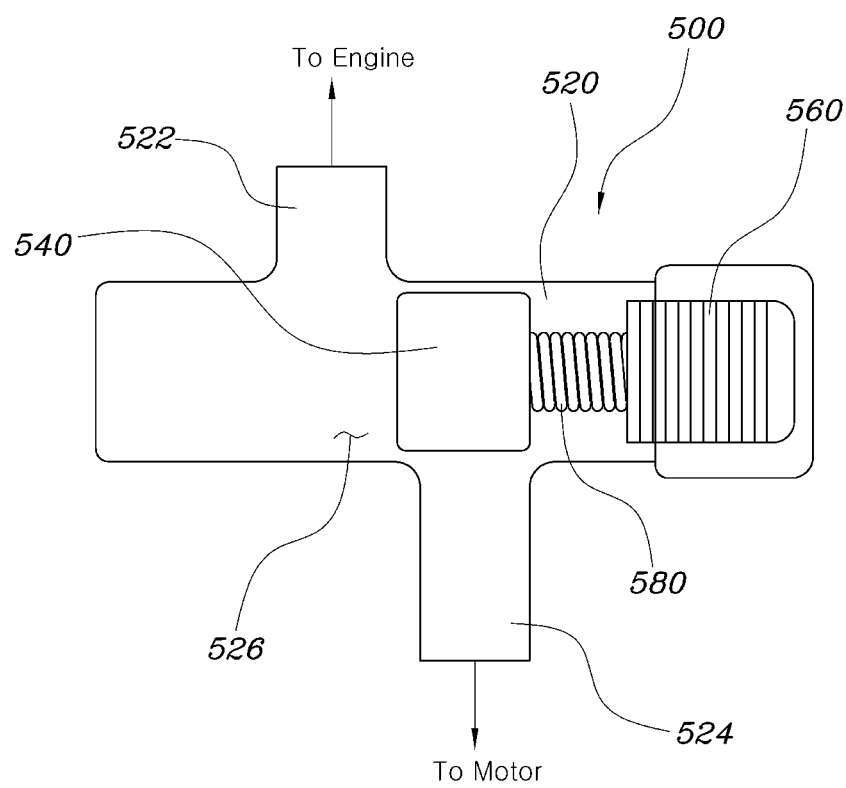
Figure 4:
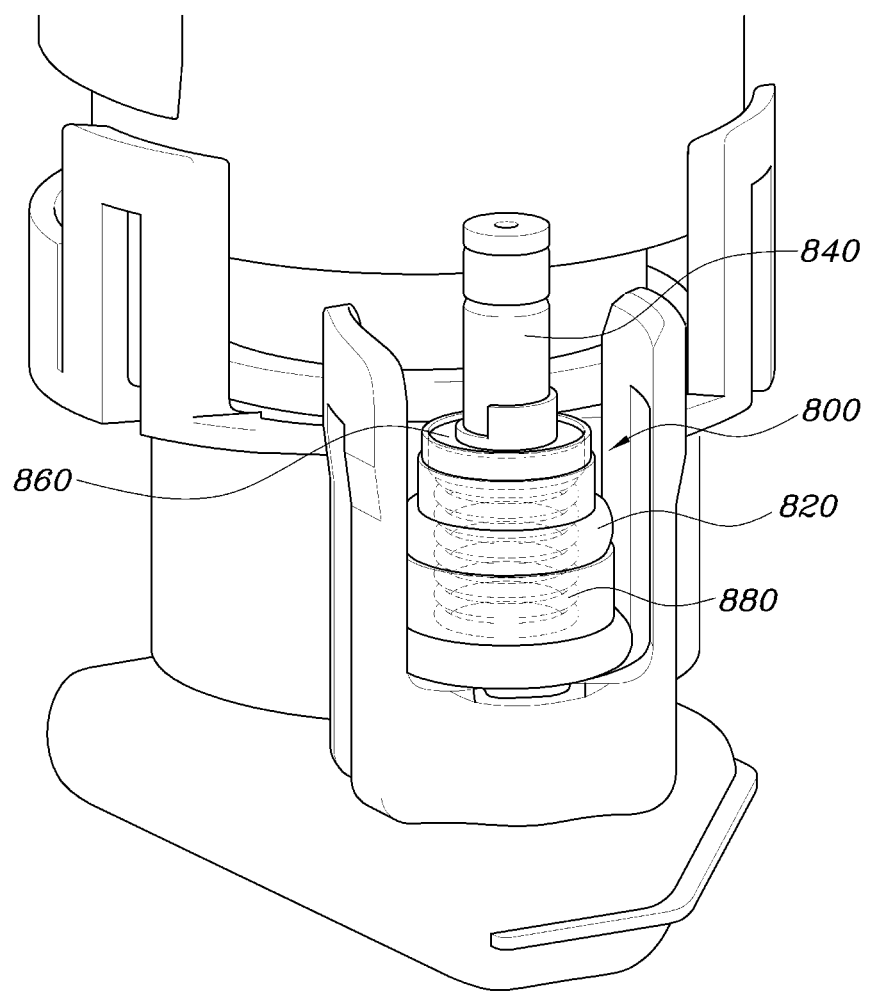
FIG. 4 is a perspective view illustrating the second blocking device of the fuel pump system of a hybrid vehicle illustrated in FIG. 1 according to an exemplary embodiment of the present invention.
Figure 5:
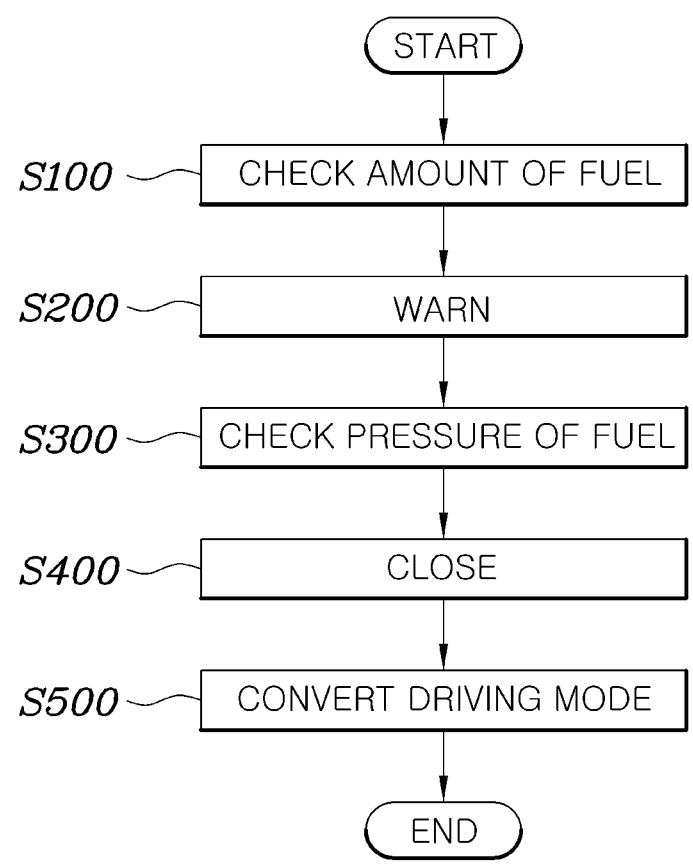

FIG. 1 is a configuration view illustrating a fuel pump system of a hybrid vehicle according to an exemplary embodiment of the present invention, FIGS. 2 and 3 are schematic views illustrating the first blocking device of the fuel pump system of a hybrid vehicle illustrated in FIG. 1, FIG. 4 is a perspective view illustrating the second blocking device of the fuel pump system of a hybrid vehicle illustrated in FIG. 1, and FIGS. 5 and 6 are flowcharts illustrating the operation of the fuel pump system of a hybrid vehicle according to the present invention.

As illustrated in FIG. 1, the fuel pump system of a hybrid vehicle according to the present invention may include a reservoir cup 100, a fuel supply pipe 300, a fuel return pipe 400, a first blocking device 500, a pressure sensor 600, and a controller 700. The reservoir cup 100 may include a fuel pump 200 configured to suction fuel from a fuel tank. The fuel supply pipe 300 may be connected to the fuel pump 200, and may extend to supply fuel therethrough to the engine in response to the operation of the fuel pump 200. The fuel return pipe 400 may be branched from the fuel supply pipe 300 and extend into the reservoir cup 100 to allow fuel to return to the reservoir cup 100 therethrough. The first blocking device 500 may be disposed on the fuel supply pipe 300, and may be configured to selectively close the fuel supply pipe 300 to block the supply of fuel. The pressure sensor 600 may be configured to detect the pressure of fuel supplied to the fuel supply pipe 300. The controller 700 may be configured to operate the first blocking device 500. In particular, the controller 700 may be configured to receive information regarding the pressure of fuel measured by the pressure sensor 600, and when the measured pressure of fuel is less than a previously-stored reference pressure, the controller 700 may be configured to operate the first blocking device 500 to close the fuel supply pipe 300, whereby fuel circulates within the reservoir cup 100.

A first end of the fuel supply pipe 300 may be connected to a supply port 12 of a plate 10, in which fuel is supplied to the engine through the supply port 12, and a second end of the fuel supply pipe 300 may be connected to the fuel pump 200, to supply fuel pumped by the fuel pump 200 to the engine side. A first end of the fuel return pipe 400 may be connected to the fuel supply pipe 300, in particular, at the top side of the reservoir cup 100, and a second end of the fuel return pipe 400 may extend to the bottom side of the reservoir cup 100. Specifically, the fuel return pipe 400 may be branched from the fuel supply pipe 300 to supply fuel supplied through the fuel supply pipe 300. A first end of the fuel return pipe 400 may be connected to the top side of the reservoir cup 100, and a second end of the fuel return pipe 400 may extend into the bottom side of the reservoir cup 100, to allow fuel pumped by the fuel pump 200 to return to the reservoir cup 100 through the fuel return pipe 400.

In addition, the fuel supply pipe 300 may be connected to the first blocking device 500 configured to block the supply of fuel by selectively closing the fuel supply pipe 300. As illustrated in FIGS. 2 and 3, an exemplary embodiment of the first blocking device 500 may be a solenoid valve including a housing 520, a plunger 540, an electromagnet 560, and a return spring 580. The housing 520 may have an engine outlet port 522 on a first side and a pump outlet port 524 on a second side, and has defined therein an inner space 526. The plunger 540 may be movably disposed within the inner space 526 of the housing 520, and may be configured to close the engine outlet port 522 or the fuel pump outlet port 524 based on the direction in which the plunger 540 is driven. The electromagnet 560 may be connected to the plunger 540, and in response to electric power applied thereto, may be configured to drive the plunger 540 to move. The return spring 580 may be engaged with one surface of the plunger 540.

The first blocking device 500 may be operated by the controller 700. When electricity is applied in response to a command from the controller 700, the first blocking device 500 may be configured to move the plunger 540 toward the engine outlet port 522 or toward the fuel pump outlet port 524 of the housing 520, to open or close the fuel supply pipe 300. As illustrated in FIG. 2, when fuel is supplied to the engine side from the fuel tank that is full of fuel, the plunger 540 may be positioned not to interfere with the engine outlet port 522 or the fuel pump outlet port 524. When fuel in the fuel tank is exhausted, as illustrated in FIG. 3, the plunger 540 may be positioned adjacent to the engine outlet port 522 or the fuel pump outlet port 524, to block the supply of fuel to the engine side.

As described above, the present exemplary embodiment ensures that the fuel pump 200 within the reservoir cup 100 is not damaged by frictional heat when the fuel pump 200 is operated when fuel in the fuel tank is exhausted. Accordingly, the fuel pump 200 configured to suction fuel from the fuel tank may be disposed within the reservoir cup 100, and the fuel supply pipe 300 may be connected to the fuel pump 200, to supply fuel suctioned by the fuel pump 200 to the engine side. In particular, according to the present exemplary embodiment, the fuel return pipe 400 may be branched from the fuel supply pipe 300 to extend to the reservoir cup 100, to cause fuel supplied to the engine side to return to the interior of the reservoir cup 100. The first blocking device 500 may be disposed on the fuel supply pipe 300 to selectively close the fuel supply pipe 300.

Due to this configuration, at ordinary times, fuel suctioned by the fuel pump 200 may be supplied to the engine side. When the fuel supply pipe 300 is closed due to the operation of the first blocking device 500, fuel that has been supplied to the engine side may return to the interior of the reservoir cup 100 through the fuel return pipe 400. As described above, the present exemplary embodiment may be configured to allow fuel to return to the reservoir cup 100 when fuel in the fuel tank is exhausted. To determine a situation in which fuel is exhausted, the pressure sensor 600 configured to detect the pressure of fuel passing through the fuel supply pipe 300 and the fuel return pipe 400 is provided. The controller 700 may be configured to receive information regarding the pressure of fuel from the pressure sensor 600, measure the pressure of fuel, and determine whether fuel is exhausted.

Since the operation of the fuel pump 200 ensures that fuel having the same pressure flows through the fuel supply pipe 300 and the fuel return pipe 400, the pressure sensor 600 may be disposed on any one of the fuel supply pipe 300 and the fuel return pipe 400. The information regarding the pressure of fuel obtained using the pressure sensor 600 may be transmitted to the controller 700, configured to compare the received information regarding the pressure of fuel with a previously-stored reference pressure, and based on the comparison, determine whether fuel is exhausted. Particularly, the reference pressure may be an initially-set pressure value empirically derived from situations in which fuel is exhausted.

When the amount of fuel in the fuel pump 200 is insufficient, the amount of fuel suctioned and supplied by the fuel pump 200 decreases, and the pressure of fuel supplied to the fuel supply pipe 300 may decrease. When the pressure of fuel detected by the pressure sensor 600 is less than the reference pressure, the controller 700 may be configured to determine that fuel in the fuel tank and the reservoir cup 100 is exhausted. Then, the controller 700 may be configured to operate the first blocking device 500 to block the supply of fuel transferred to the engine side through the fuel supply pipe 300, to allow fuel to return into the reservoir cup 100 through the fuel return pipe 400.

According to the present exemplary embodiment, a second blocking device 800 may be further provided on the fuel return pipe 400. The second blocking device 800 may be configured to permit or block the supply of fuel based on the pressure of fuel supplied through the fuel return pipe 400. Specifically, the second blocking device 800 may be disposed on the fuel return pipe 400 to permit or block the supply of fuel based on the pressure of fuel, to supply fuel transferred from the fuel pump 200 to the engine side or return the fuel to the reservoir cup 100.

The second blocking device 800 may be a regulator configured to permit the supply of fuel when the pressure of fuel supplied through the fuel return pipe 400 is equal to or greater than a preset pressure and block the supply of fuel when the pressure of fuel supplied through the fuel return pipe 400 is less than the preset pressure. For example, as illustrated in FIG. 4, the second blocking device 800 may include a body 820 having a fuel inlet port and a fuel outlet port, a valve seat member 840 fixedly fitted into the outlet port side of the body 820, and a valve 860 disposed within the body 820 and the valve 860 may abut the valve seat member 840. When pressure of oil entering through the inlet port increases to a predetermined pressure or greater, the valve 860 may be pushed toward the outlet port, thereby allowing oil to circulate. The second blocking device 800 may further include a return spring 880 configured to allow the valve 860 to move to the original position when the pressure of oil is reduced.

Consequently, when a sufficient amount of fuel is contained within the fuel tank, the controller 700 may be configured to operate the first blocking device 500 to open the fuel supply pipe 300, to supply fuel suctioned by the fuel pump 200 to the engine side. As the first blocking device 500 is opened, fuel pumped by the fuel pump 200 may be supplied to the engine side through the fuel supply pipe 300. Since the pressure of fuel is not applied to the second blocking device 800 disposed on the fuel return pipe 400, the second blocking device 800 may be configured to close the fuel return pipe 400.

When fuel in the fuel tank is exhausted, the controller 700 may be configured to operate the first blocking device 500 to close the fuel supply pipe 300, to return the fuel suctioned by the fuel pump 200 through the fuel return pipe 400 instead of being supplied to the engine side. Particularly, as the pressure of fuel applied to the second blocking device 800 disposed on the fuel return pipe 400 increases, the second blocking device 800 may be configured to execute an opening operation, to cause fuel pumped by the fuel pump 200 to return to the reservoir cup 100 through the fuel supply pipe 300. Thus, when fuel is exhausted and the fuel pump 200 is operated following the operation of the engine, fuel in the fuel tank may return to the reservoir cup 100 to circulate through the fuel pump 200 instead of being completely consumed by being supplied to the engine side. Accordingly, the fuel pump 200 may be prevented from operating in the dry-run condition, whereby the fuel pump 200 may be damaged.

When the pressure of fuel measured by the pressure sensor 600 is equal to or greater than the reference pressure, the controller 700 may be configured to operate the first blocking device 500 to open the fuel supply pipe 300. In other words, when the pressure of fuel measured by the pressure sensor 600 is equal to or greater than the reference pressure, the controller 700 may be configured to operate the first blocking device 500 to be opened, thereby causing fuel pumped by the fuel pump 200 to be supplied through the fuel supply pipe 300, the fuel may be properly supplied. In addition, the controller 700 may be configured to receive information regarding fuel from a fuel gauge sensor 900 disposed within the fuel tank. When the amount of fuel measured by the fuel gauge sensor 900 is less than a previously-stored reference level, the controller 700 may be configured to receive information regarding the pressure of fuel and operate the first blocking device 500 based on the received information regarding the pressure of fuel.

In other words, the controller 700 may be configured to determine whether the amount of fuel in the fuel tank is sufficient using the fuel gauge sensor 900 prior to determining whether fuel is exhausted based on the pressure of fuel. As described above, the controller 700 may be configured to more accurately determine whether fuel in the fuel tank and the reservoir cup 100 may be exhausted by primarily detecting the amount of fuel in the fuel tank by comparing the amount of fuel measured by the fuel gauge sensor 900 with the reference level and secondarily detecting whether fuel in the fuel tank is exhausted based on the pressure of fuel measured by the pressure sensor 600.

In addition, when the amount of fuel measured by the fuel gauge sensor 900 is less than the previously-stored reference level, the controller 700 may be configured to generate a fuel warning signal. In other words, when the amount of fuel in the fuel tank is determined to be insufficient based on the amount of fuel measured by the fuel gauge sensor 900, the controller 700 may be configured to turn on a warning lamp on a cluster to warn a driver of the situation in which fuel is exhausted, and thus, the fuel tank may be refilled with fuel. In particular, the present exemplary embodiment may be applied to hybrid vehicles. When fuel is exhausted while a vehicle is running using the engine, the operation of the fuel pump 200 may be stopped to prevent the fuel pump 200 from operating excessively and then the driving mode may be converted to electric driving mode to prevent the fuel pump 200 from being damaged and to ensure that the vehicle runs properly.

To control the above-described fuel pump system of a hybrid vehicle, a method of controlling fuel pump system of a hybrid vehicle according to an exemplary embodiment of the present invention is provided. As illustrated in FIG. 5, the control method may include a fuel amount checking step S100, a warning step S200, a fuel pressure checking step S300, a closing step S400. The various steps or processes may be executed by the above-described controller. In particular, the method may include comparing the amount of fuel measured by a fuel gauge sensor with a reference level previously stored in a controller and turning on a warning lamp when the measured amount of fuel is less than the reference level. Additionally, the method may include comparing the pressure of fuel measured by a pressure sensor with a reference pressure previously stored in the controller and closing a fuel supply pipe by operating a first actuation device when the measured pressure of fuel is less than the reference pressure. The method may further include a driving mode conversion step S500 after the closing step S400. In particular, when the pressure of fuel is less than the reference level, the operation of a fuel pump may be stopped, and the driving mode of the vehicle is converted to electric driving mode.

As illustrated in FIG. 6, in the control method according to the present exemplary embodiment, when the fuel pump 200 is operated in response to the engine being started in S102, the amount of fuel measured by the fuel gauge sensor 900 may be compared with the reference level in S104, and when the measure amount of fuel is less than the reference level, a fuel warning lamp may be turned on to transmit a warning message to a driver. In particular, according to the present exemplary embodiment, in S302, the pressure of fuel may be measured using the pressure sensor 600 disposed on the fuel line within the reservoir cup 100 to detect when fuel is exhausted. In S402, when the measured pressure of fuel is less than the reference pressure, the first actuation device may be operated to close the fuel supply pipe 300.

Particularly, in response to the fuel supply pipe 300 being closed, a second actuation device disposed on the fuel return pipe 400 may be opened in S404. Thus, in S406, fuel pumped by the fuel pump 200 may return to reservoir cup 100 through the fuel return pipe 400 instead of being supplied to the engine side through the fuel supply pipe 300. In addition, when the pressure of fuel is less than the reference pressure, the operation of the fuel pump may be stopped in S502, and the driving mode of the vehicle may be converted to the electric driving mode in S504. Thus, the fuel pump 200 may be prevented from being damaged and the vehicle may run properly. Accordingly, the fuel pump 200 may be prevented from being stuck due to frictional heat, which would otherwise be caused when the fuel pump 200 operates in a dry condition.

In another exemplary embodiment of the method of controlling a fuel pump of a hybrid vehicle according to the present invention, the fuel pressure checking step S300 may include comparing the pressure of fuel measured by the pressure sensor with the reference pressure, in which the pressure sensor may be configured to detect the pressure of fuel supplied from the reservoir cup of the fuel pump to the engine side in response to the operation of the fuel pump, and the closing step S400 may include stopping the operation of the fuel pump when the pressure of fuel measured in the fuel pressure checking step S300 is less than the reference pressure. In addition, the control method according to the present exemplary embodiment may further include a driving mode conversion step S500 of converting the driving mode of the vehicle to the electric driving mode after the closing step S400.

As described above, when the pressure of fuel measured in the fuel pressure checking step S300 is less than the reference pressure, fuel in the fuel tank may be determined to be exhausted, and the closing step S400 of blocking the supply of fuel to the engine side and stopping the operation of the fuel pump may be performed. In addition, the driving mode conversion step S500 of converting the engine-driving driving mode to the electric driving mode may be performed to prevent the fuel pump from being damaged due to excessive operation and ensure that the vehicle may efficiently run due to the conversion to the electric driving mode.

Alternatively, the driving mode conversion step S500 may cause the fuel pump to operate ordinarily when the measured pressure of fuel is equal to or greater than the reference pressure, and thus, the vehicle may run due to the operation of the engine. In addition, the fuel amount checking step S100 of comparing the measure amount of fuel with the reference level previously stored in the controller may be performed prior to the fuel pressure checking step S300, and when the measured amount of fuel is less than the reference level, the warning step S200 of turning on the warning lamp may be performed. As described above, when the amount of fuel remaining in the fuel tank is less than the reference level, the driver may be warned and notified of the situation in which fuel is exhausted. Afterward, when the driving mode may be converted in the driving mode conversion step S500, the driver may recognize that the driving mode has been converted smoothly.

According to the system of the fuel pump 200 having the above-described structure, it may be possible to prevent the fuel pump 200 from continuing to operate when fuel is exhausted, whereby the fuel pump 200 may be damaged. In particular, the pressure of fuel may be measured in response to exhaustion of fuel, and when the pressure of fuel is low, fuel may be circulated within the fuel pump 200 instead of being supplied to the engine side, thereby preventing the fuel pump 200 from being stuck due to frictional heat.

Although an exemplary embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A method of controlling a fuel pump system of a hybrid vehicles wherein the fuel pump system includes:
    a reservoir cup including a fuel pump configured to suction fuel from a fuel tank;
    a fuel supply pipe connected to the fuel pump and extending to allow fuel to be supplied therethrough to an engine in response to an operation of the fuel pump;
    a fuel return pipe branched from the fuel supply pipe and extending into the reservoir cup to allow fuel to return to the reservoir cup therethrough;
    a first blocking device disposed on the fuel supply pipe, the first blocking device configured to selectively close the fuel supply pipe to block the supply of fuel; and
    a pressure sensor configured to detect a pressure of fuel supplied to the fuel supply pipe, the method comprising:
    receiving, by a controller, information regarding the pressure of fuel measured by the pressure sensor;
    converting, by the controller, driving mode to electric driving mode when the measured pressure of fuel is less than a previously-stored reference pressure;
    comparing, by the controller, an amount of fuel measured by a fuel gauge sensor with a reference level previously stored in the controller;
    turning on, by the controller, a warning lamp when the measured amount of fuel is less than the reference level;
    comparing, by the controller, a pressure of fuel measured by a pressure sensor with a reference pressure previously stored in the controller;
    closing, by the controller, a fuel supply pipe by operating a first actuation device when the measured pressure of fuel is less than the reference pressure.

2. The method according to claim 1, further comprising, after closing the fuel supply pipe, when the pressure of fuel is less than the reference level, stopping, by the controller, an operation of a fuel pump, and converting driving mode of a vehicle to electric driving mode.

* * * * *